I. N. HARBAUGH.
Harrow.
No. 167,896. Patented Sept. 21, 1875.
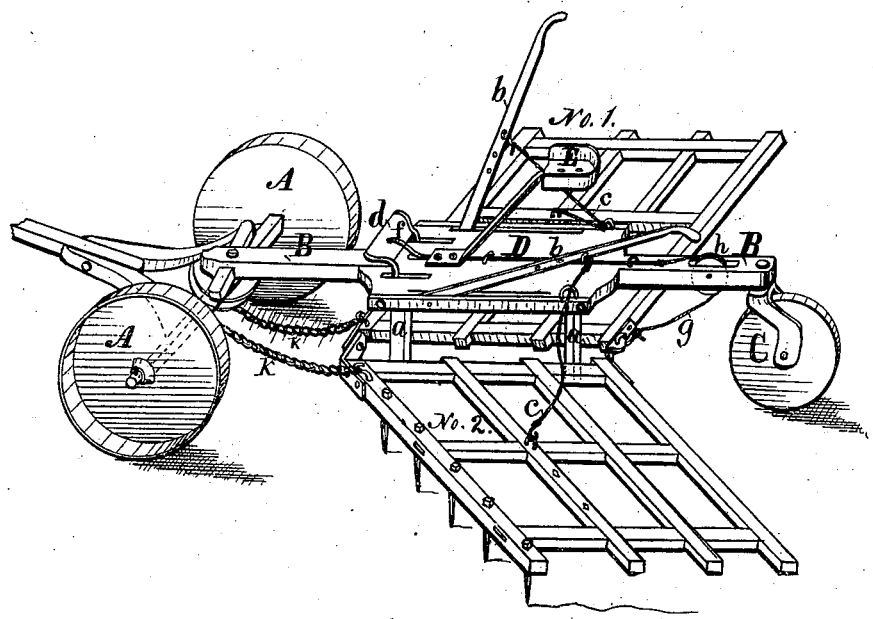
Witnesses.
Arthur Wright.
Geo. L. Garrett.
Inventor, Isaac N. Harbaugh,
Attorney, Thomas G. Orwig.

UNITED STATES PATENT OFFICE.

ISAAC N. HARBAUGH, OF BRIGHTON, IOWA.

IMPROVEMENT IN HARROWS.

Specification forming part of Letters Patent No. 167,896, dated September 21, 1875; application filed February 1, 1875.

*To all whom it may concern:*

Be it known that I, ISAAC N. HARBAUGH, of Brighton, in the county of Washington and State of Iowa, have invented a Flexible Riding-Harrow, of which the following is a specification:

The object of my invention is to provide a harrow upon which the driver can mount and ride, and alternately lift sections, to clean them of clogging-matter, by simply pulling levers, and also elevate and make inoperative the entire harrow by pressing his feet on a foot-rest. It consists in forming and combining a truck and a flexible harrow, as hereinafter fully set forth.

My drawing is a perspective view, illustrating the construction and operation of my invention.

A A represent a two-wheeled carriage, or the front part of a common farm-wagon. B B is the central beam of my truck, pivoted to the carriage A A at its front end, and supported upon a swiveled caster-wheel, C, at its rear end. D is a platform in the center of the truck B B. It may be formed and attached in any suitable way. E is a driver's seat, suspended and supported above the platform D by any suitable means. Nos. 1 and 2 are diamond-shaped harrows or sections, hinged together at their contiguous sides by any suitable hinge-joints. *a a* are posts or bars rigidly attached to the middle and under side of the truck, to project down between the two harrow-sections to steady the harrow, and to retain it in a central position relative to the center of the truck. *b b* are levers or handles, pivoted to the platform D in such positions, relative to the driver's seat E, that they will be within the reach and control of the driver, when mounted on his seat. *c c* are cords or chains attached to the harrow-sections Nos. 1 and 2, and then passed through loops or bearings fixed in the sides and rear end of the platform D, and hooked or linked to the levers *b b*. *d* is a foot-rest or treadle, pivoted to the front end of the platform D in such a manner and position, relative to the driver's seat E, that the driver can readily rest his feet upon it, and operate it to elevate the harrow-sections, lift their contiguous sides for purposes of dropping clogging-matter, or to make them inoperative. *f* is a rod linked to the foot-rest *d*, and passed rearward through a suitable groove in the platform, or loops, to connect with the cord or chain *g*, running over the pulley *h*, fixed in the rear part of the truck, and then downward and forward, to be attached to the harrows Nos. 1 and 2. *k k* are chains linked to the front ends of the harrows and the axle of the carriage A A.

In the practical operation of my flexible and riding harrow the driver can mount upon the platform D and seat E, and readily govern the team and also the harrow. The harrow, consisting of the two wings Nos. 1 and 2, will fit over a ridge or into a furrow, and readily conform with an uneven surface. By operating the lever-handles *b b* the wings can be readily lifted to pass obstructions, and to drop weeds and other substances that may gather and clog the harrow-teeth. By pressing the feet upon the foot-rest *d* the central portion of the complete harrow may be lifted for similar purposes. By using the levers *b b* and foot-rest *d* simultaneously the complete harrow may be elevated to clean it, pass obstructions, turn around, and to be retained inoperative.

I claim as my invention—

The truck B B, having caster C, platform D, seat E, pendent bars *a a*, levers *b b*, foot-rest and treadle *d*, and pulley *h*, in combination with the carriage A A and harrow-sections Nos. 1 and 2, substantially as and for the purposes shown and described.

ISAAC N. HARBAUGH.

Witnesses:
L. J. BIDWELL,
S. M. KREAMER.